US011481913B2

United States Patent
Deegan et al.

(10) Patent No.: US 11,481,913 B2
(45) Date of Patent: Oct. 25, 2022

(54) LIDAR POINT SELECTION USING IMAGE SEGMENTATION

(71) Applicant: GM Cruise Holdings LLC, San Francisco, CA (US)

(72) Inventors: Thomas Deegan, San Francisco, CA (US); Yue Zhao, Sunnyvale, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 83 days.

(21) Appl. No.: 16/815,123

(22) Filed: Mar. 11, 2020

(65) Prior Publication Data
US 2021/0287387 A1  Sep. 16, 2021

(51) Int. Cl.
*G06T 7/521* (2017.01)
*G06T 7/10* (2017.01)
*G06N 3/08* (2006.01)
*G06N 3/04* (2006.01)

(52) U.S. Cl.
CPC ............ *G06T 7/521* (2017.01); *G06N 3/0454* (2013.01); *G06N 3/08* (2013.01); *G06T 7/10* (2017.01); *G06T 2207/10028* (2013.01); *G06T 2207/20081* (2013.01); *G06T 2207/20084* (2013.01)

(58) Field of Classification Search
CPC ........... G06K 9/00201; G06K 9/00805; G06N 20/00; G06T 2207/10028; G06T 7/521; G06T 7/70
See application file for complete search history.

(56) References Cited

U.S. PATENT DOCUMENTS

| 2021/0063578 A1* | 3/2021 | Wekel | G06K 9/6271 |
| 2021/0104056 A1* | 4/2021 | Lee | G01S 17/931 |

* cited by examiner

*Primary Examiner* — Ross Varndell
(74) *Attorney, Agent, or Firm* — Polsinelli, PC

(57) ABSTRACT

The subject disclosure relates to techniques for selecting points of an image for processing with LiDAR data. A process of the disclosed technology can include steps for receiving an image comprising a first image object and a second image object, processing the image to place a bounding box around the first image object and the second image object, and processing an image area within the bounding box to identify a first image mask corresponding with a first pixel region of the first image object and a second image mask corresponding with a second pixel region of the second image object. Systems and machine-readable media are also provided.

16 Claims, 6 Drawing Sheets

LIDAR POINT SELECTION USING IMAGE SEGMENTATION

BACKGROUND

1. Technical Field

The subject technology provides solutions for facilitating distance estimations of image objects and in particular, for using machine-learning models to segment potentially occluded image objects for distance estimation using Light Detection and Ranging (LiDAR) data.

2. Introduction

Image processing systems that are configured to perform object recognition often use bounding boxes to identify image regions corresponding with locations of objects of interest. In some applications, objects need to be transformed into three-dimensional (3D) space.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
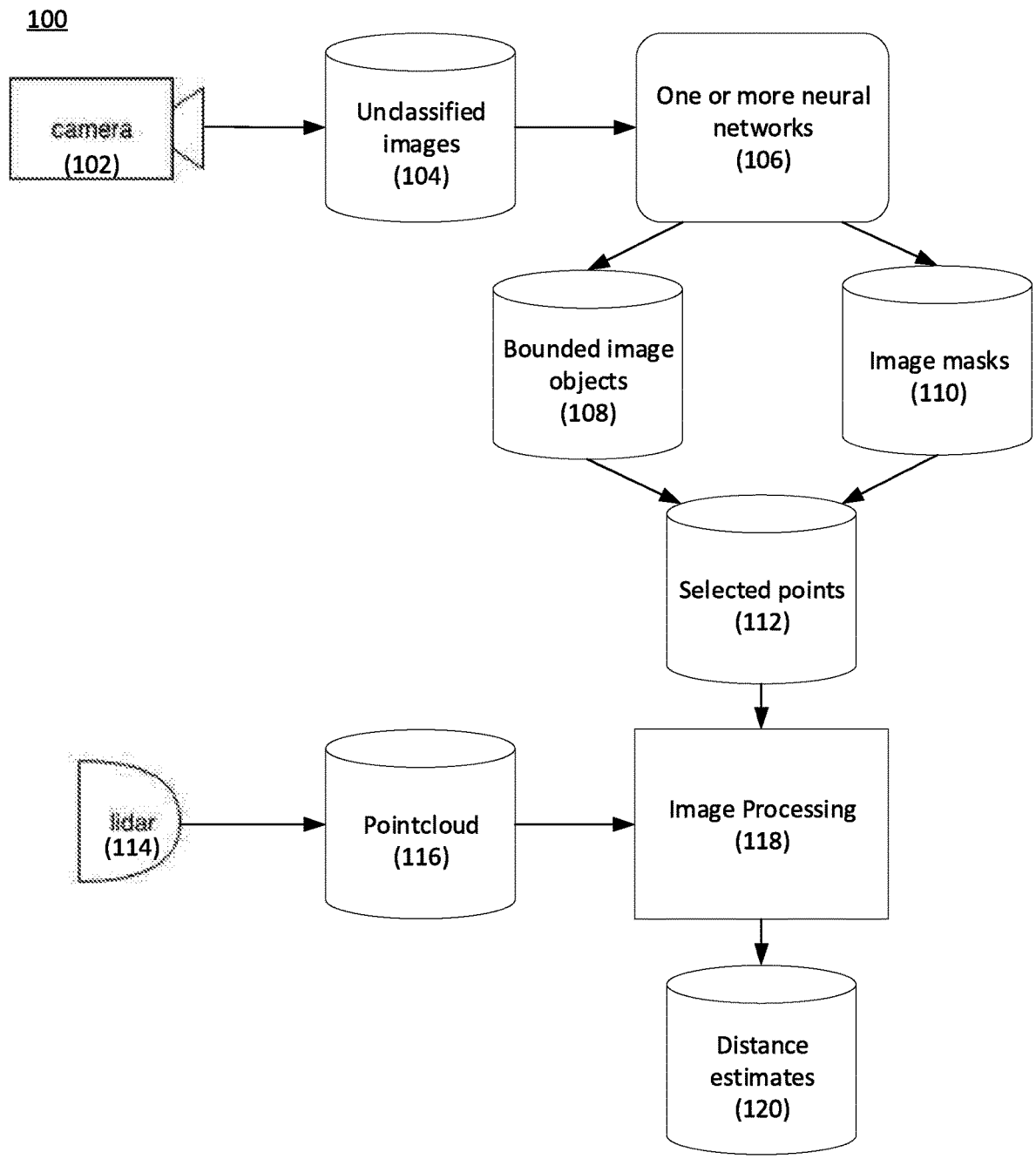
FIG. 1 illustrates an example system that can be used to select points in images for processing with Light Detection and Ranging (LiDAR) data, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

In some image processing techniques, bounding boxes are used to identify an image region that contains one or more objects (image objects) of potential interest. However, using conventional bounding box processing techniques, it is not uncommon for multiple image objects to overlap in two-dimensional (2D) pixel space. For example, an object of potential interest may be partially occluded by an object of no interest; alternatively, two objects of interest may partially occlude one another. Close proximities (or occlusions) between image objects make it difficult to disaggregate and classify the image objects, as well as to perform object ranging, for example, to determine locations of different image objects in three-dimensional (3D) space. Such errors can be especially problematic for image-processing needed to enable autonomous vehicle (AV) navigation and guidance. For example, autonomous vehicles rely heavily on thousands of images received from onboard cameras or sensors every minute to navigate on roadways. Each of these images capture many objects, such as pedestrians, other vehicles, sidewalks, road signs, etc. However, all of these objects are captured in two-dimensional (2D) space as images. Thus, there is a need to maximize highly accurate data during transformation from 2D space into 3D space. In other words, there is a need for facilitating highly accurate distance estimations of objects in images.

Aspects of the disclosed technology address the limitations of conventional distance estimations of objects in images by using machine-learning models to segment the images and select points within the segments of the images for processing with Light Detection and Ranging (LiDAR) data. More specifically, one or more neural networks are trained to classify pixels based on objects in the image at the corresponding pixel and place bounding boxes around the objects. The one or more neural networks also segment images into image segments or pixel regions that can be selected. The one or more neural networks may then combine the bounding boxes and the pixel regions to select specific pixels or points on the image to belong to each object. Then, the selected points of the image can be processed with LiDAR data to determine the depth of the object at the selected points of the image.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

FIG. 1 illustrates an example system 100 that can be used to facilitate distance estimates of objects, according to some aspects of the disclosed technology. System 100 includes one or more cameras 102 that capture and store unprocessed (unbounded) images into a repository of unclassified images 104 from which the unprocessed images are provided to one or more neural networks 106. Similarly, the system 100 also includes one or more Light Detection and Ranging (LiDAR) instruments 114 that record and capture LiDAR data, for example, that is stored in a pointcloud database 116. The LiDAR data can represent the same objects recorded by cameras 102; that is, the LiDAR data corresponds to the images captured by the one or more cameras 102.

The one or more neural networks 106 can be configured to receive unclassified images 104 and to identify one or more image objects in the unprocessed images. Neural networks 106 can then place bounding boxes around the one or more image objects, and output the bounded image objects to a repository of bounded image objects 108. For example, an image may include a person (i.e. a first image object) occluded by a bush (i.e. a second image object); thus, the one or more neural network 106 will bound the person with a first bounding box and the bush with a second bounding box. However, in some instances, parts of the bush may overlap the first bounding box and parts of the person may overlap the second bounding box.

The one or more neural networks 106 can also be configured to receive and segment, based upon detected objects, the unbounded image into pixel regions associated with the detected objects. The one or more neural networks 106 can then identify image masks corresponding to the pixel regions. The image masks are then stored in a repository of image masks 110.

The bounded image objects and the image masks of interest are combined to select points 112 for processing with LiDAR data. Selected points 112 are then processed 118 with the corresponding LiDAR data stored in the pointcloud 116 to determine distance estimates 120 corresponding to each selected point in the bounded image objects.

In some instances, image processing 118 may identify masks corresponding to detected objects only within the bounded image objects. In other words, the image processing 118 may occur within an image area within the bounding box to identify the image masks corresponding to the pixel region of the bounded image object. In these instances, the total processing power utilized is reduced because the image processing 118 is not occurring for all objects in the image.

In some implementations, the one or more neural networks 106 can process one or more pixels in the pixel regions to determine classification labels for the image objects. The one or more neural networks 106 can then associate the classification label with the image objects. Examples of the foregoing embodiments are discussed in relation to graphical examples provided by FIGS. 2-5, discussed below.

Figure 2:
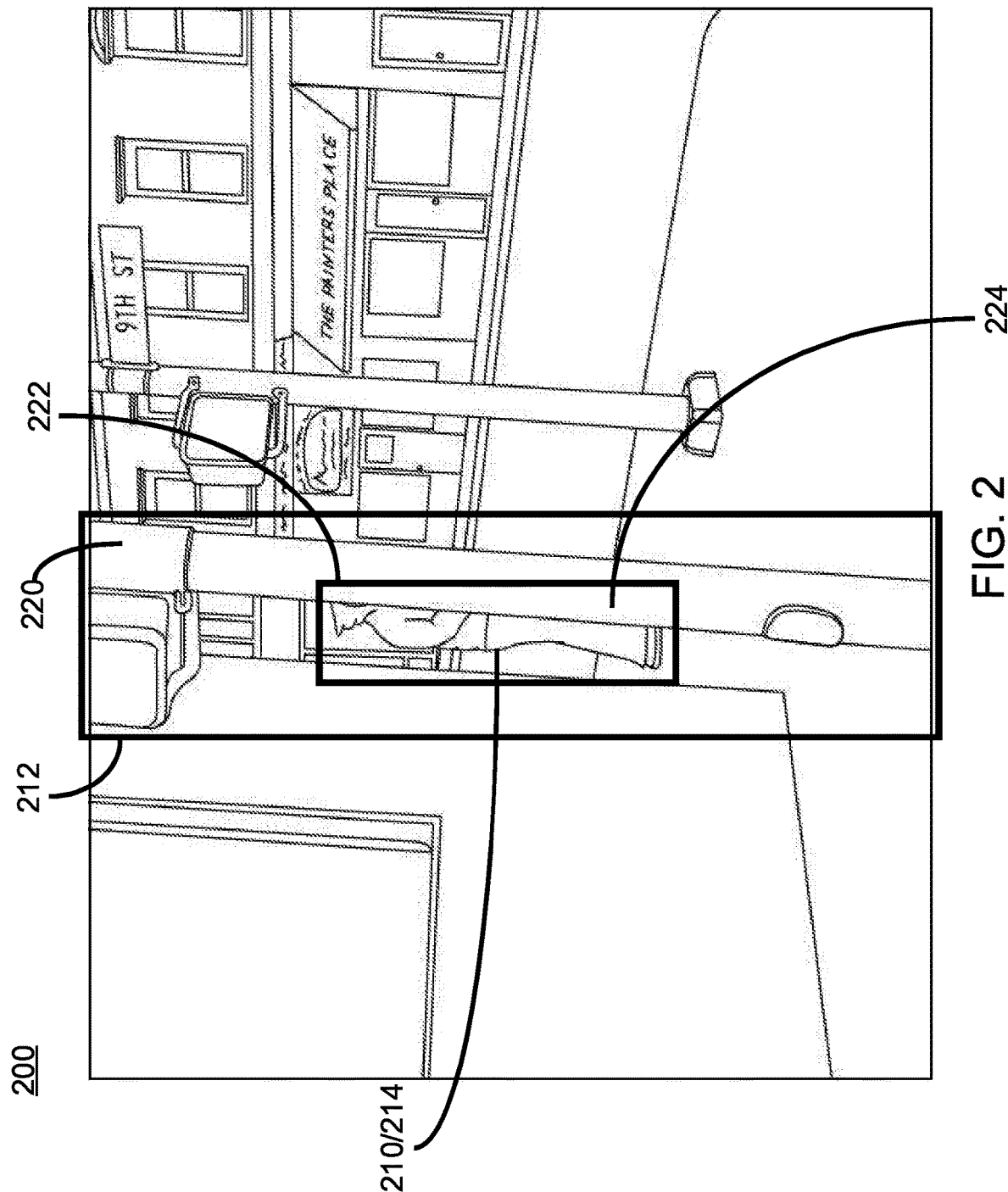
FIG. 2 illustrates an example of an initial bounding box placement performed using a bounding box placement process of the disclosed technology.

FIG. 2 graphically illustrates placement of bounding boxes 212, 222 performed using a process of the disclosed technology. In the example of FIG. 2, image 200 can represent an initial output of a bounding box process performed by one or more neural networks. The one or more neural networks are configured to detect one or more image objects, such as vehicles, people, signs, etc. In this example, a first image object 210 and a second image object 220 are detected (e.g., using machine-learning techniques). The first image object 210 is a pedestrian walking and the second image object 220 is a vehicle. The one or more neural networks insert into image 200 a first bounding box 212 encompassing a pixel area of the first image object 210 and a second bounding box 222 encompassing a pixel area of the second image object 220. As shown, the first image object 210 is partially occluded by the second image object 220, such that the first bounding box 212 includes a portion 224 of the second image object 204 (the pole). In other words, the pedestrian is positioned behind the pole, partially occluded by the pole. Similarly, the second bounding box 222 includes a portion 214 of the first image object 210 (the pedestrian). It is understood that a similar bounding box processing methodology can be applied to one or more other image objects in the same image set.

Figure 3:
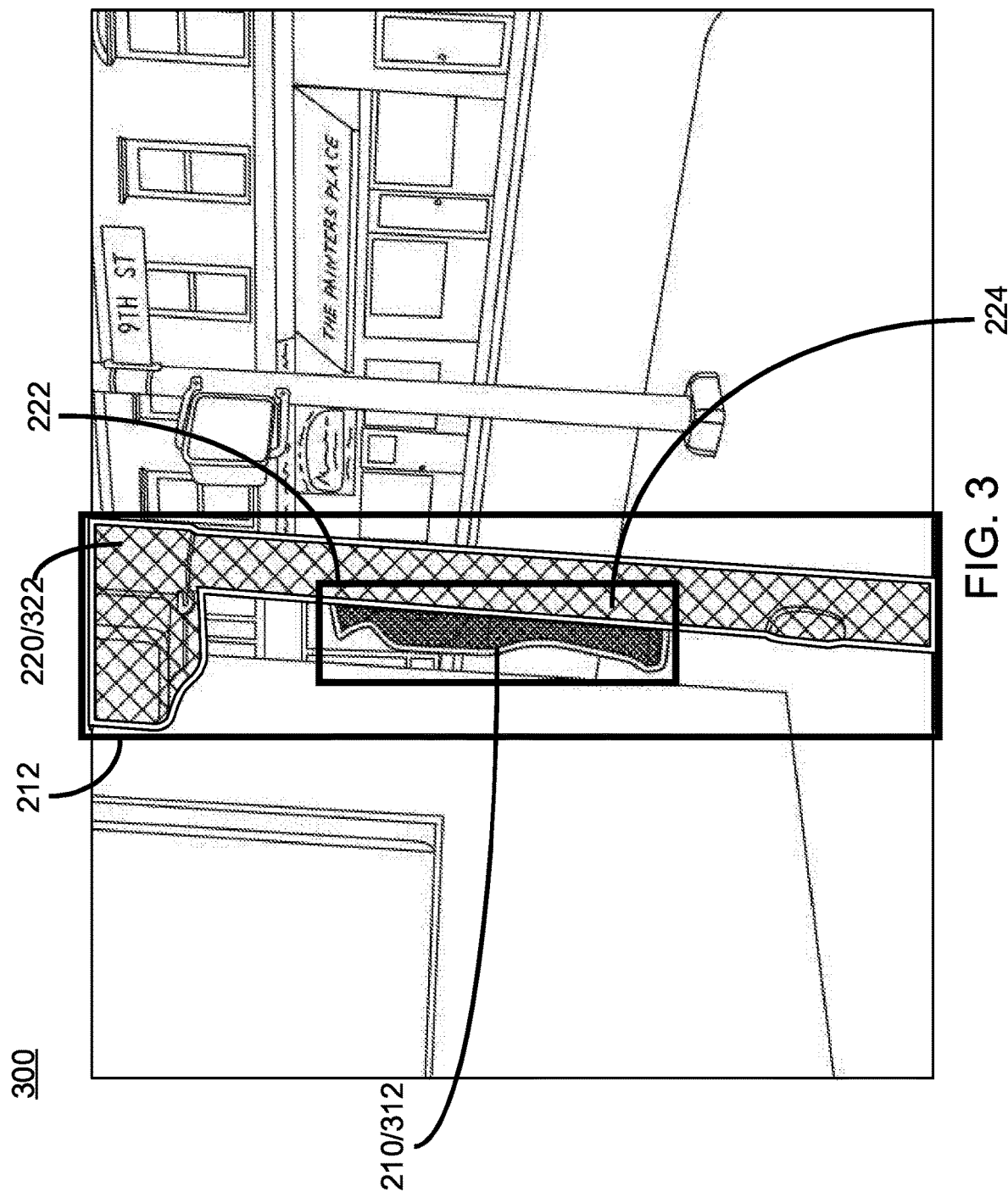
FIG. 3 illustrates an example of an image mask placement using an image mask placement process, according to some aspects of the disclosed technology.

FIG. 3 illustrates a placement of image masks 312, 322 performed using a process of the disclosed technology. In particular, image 300 illustrates an example in which image masks 312, 322 are identified in the image 300. As shown, in some instances, the image masks 312, 322 are identified solely within bounding boxes 212, 222. As further illustrated, a first image mask 312 is identified corresponding with a first pixel region of the first image object 210 and a second image mask 322 is identified corresponding with a second pixel region of the second image object 220. The image masks 312, 322 thus more accurately encompasses and identify respectively the first and second image objects 210, 220. Additionally, as discussed above, additional processing steps can be performed to identify semantic labels that are associated with the image object. In the example provided by images 200, 300, the semantic label "person" may be associated with the first image object 210 and the semantic label "car" may be associated with the second image object 220.

FIG. 3 further illustrates points (shown as dots) within the image masks 312, 322. These points are selected for processing with LiDAR data, such that LiDAR data corresponding to the location of the points is used to process the points for distance estimates. Thus, each point corresponds to a distance estimate that may be used by an autonomous vehicle. In some instances, the location of the points may be used to process distance estimates for each image object 210, 220 as a whole. In other words, the output of the points processed with LiDAR data will result in a depth of or distance estimate of the image object 210, 220 instead of distance estimates for each individual point.

Figure 4:
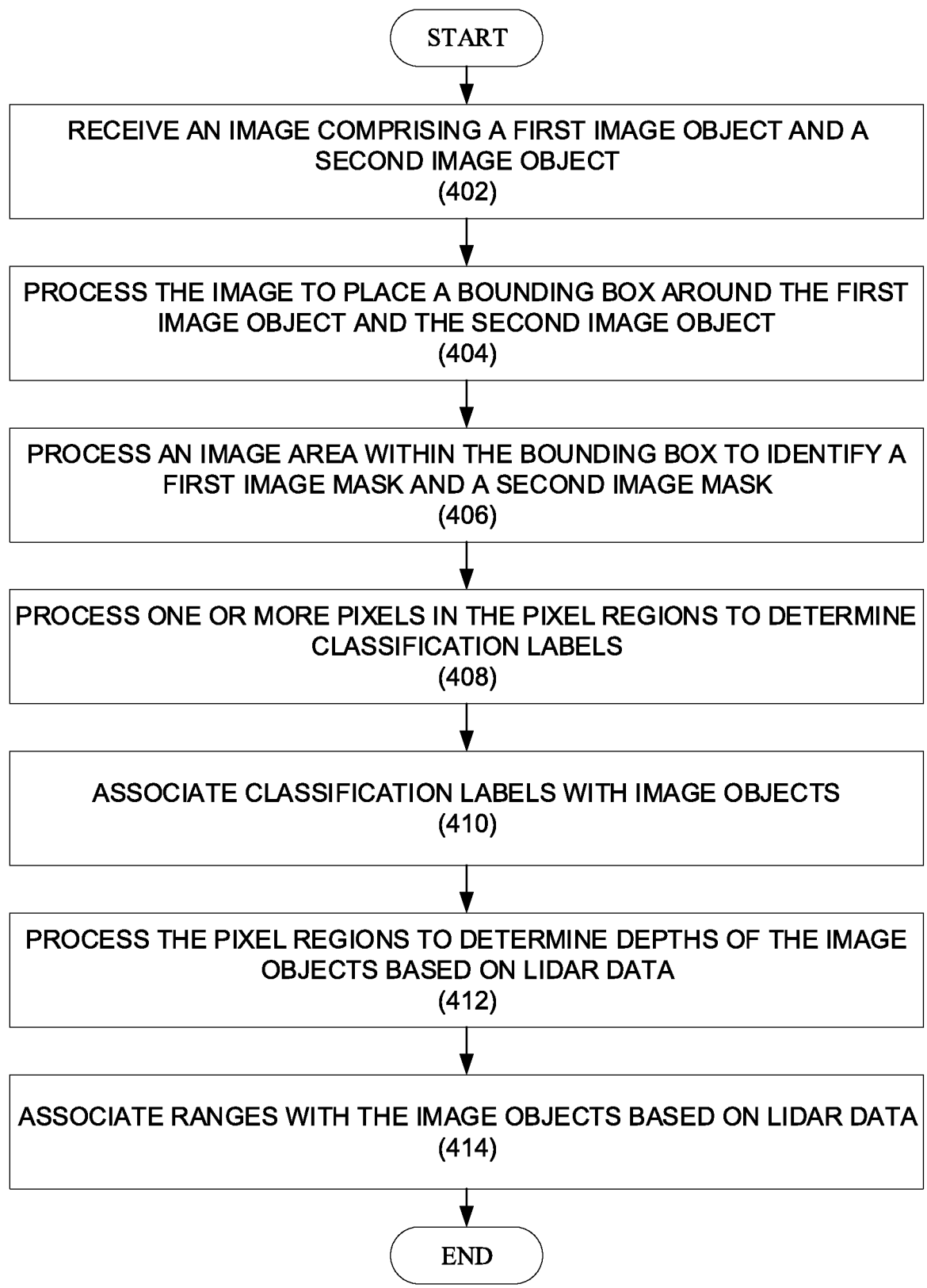
FIG. 4 illustrates steps of an example process for selecting points in an image for processing with LiDAR data, according to some aspects of the disclosed technology.

FIG. 4 illustrates steps of an example process 400 for point selection for processing with LiDAR data, according to some aspects of the disclosed technology. Process 400 begins with step 402 in which an image is received. More specifically, the image is received from a first data set recorded by one or more cameras. In some instances, the image may be received from a machine-learning model that has processed the image. In other instances, as discussed above, the image may be an unprocessed image that contains one or more unbounded image objects. The image comprises at least a first image object and a second image object, such that at least a portion of the first image object is occluded or obscured by at least a portion of the second image object. For example, a leg of a person (i.e. a portion of the first image object) is partially occluded by a stop sign (i.e. the second image object). Furthermore, we may be interested in selecting points associated with the person for processing with LiDAR data. In other words, we may be interested in determining a distance estimate of the person, but not the stop sign.

For clarity and discussion purposes, the following will discuss an instance, in which at least a portion of the first image object is obscured by at least a portion of the first image object, wherein the first image object is a primary image object of interest for LiDAR point selection. However, it is to be understood that the first image object and the second image object may be used interchangeably to label or select image objects. In some instances, the opposite may be true, in that at least a portion of the second image object is occluded or obscured by at least a portion of the first image object and the second image object is the image object of interest. In some instances, both the first and second image objects may occlude or obscure at least a portion of the other image object. Moreover, one of ordinary skill in the art will understand that any combination of image objects may be of interest for LiDAR point selection.

In step 404, the image is processed to identify and place a bounding box around the image object of interest (i.e. the first image object) and the portion of the second image object that partially occludes the first image object. In some instances, the image is processed through one or more neural networks, such that processing the image to place the bounding box around the first image object and the second image object is performed using a first machine-learning model.

In step 406, the image is processed to identify image masks corresponding to pixel regions of each image object. Thus, the image is processed to identify a first image mask corresponding with a first pixel region of the first image object and a second image mask corresponding with a second pixel region of the second image object. In some instances, only an image area within the bounding box of the image is processed, such that the overall processing power is reduced. In some instances, the image is processed through one or more neural networks, such that processing the image or image area within the bounding box to identify the first image mask and second image masks is performed using a first machine-learning model.

In step 408, one or more pixels in the pixel regions are processed to determine classification labels for the image objects. Thus, one or more pixels in the first pixel region are processed to determine a first classification label for the first object and one or more pixels in the second pixel region are processed to determine a second classification label for the second image object.

In step 410, the classification labels are associated with the corresponding image objects. In other words, the first classification label is associated with the first image object and the second classification label is associated with the second image object.

In step 412, the pixel regions are processed with LiDAR data to determine a depth of the corresponding image objects. Thus, the first pixel region is processed to determine a depth of the first image object based on LiDAR data and the second pixel region is processed to determine a depth of the second image object based on LiDAR data.

In step 414, the image objects are associated with a range or distance estimate based upon the determined depths, which is based on LiDAR data. Thus, the first image object is associated with a first range or distance estimate based on LiDAR data and the second image object is associated with a second range or distance estimate based on LiDAR data.

Figure 5:
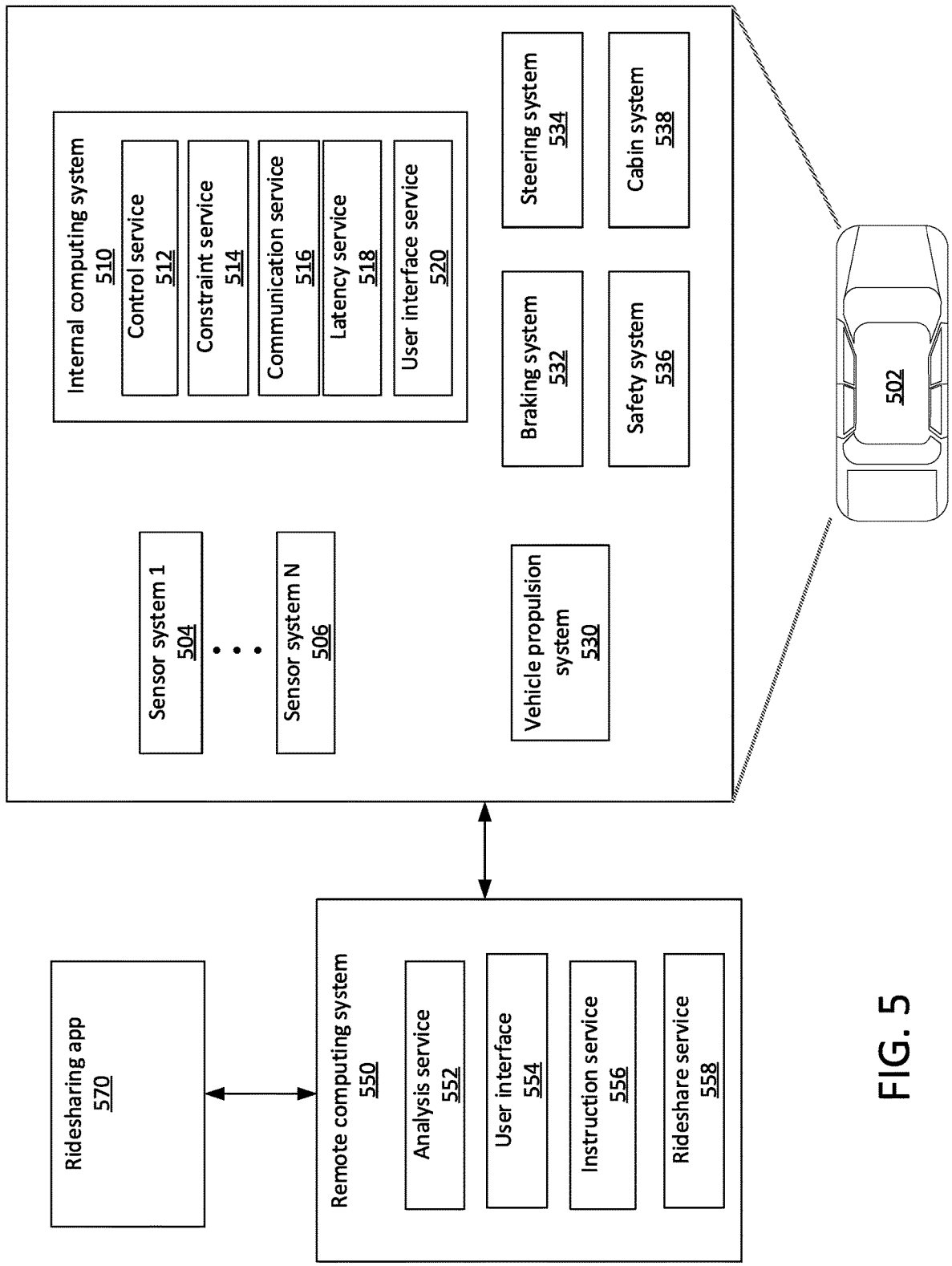
FIG. 5 illustrates an example environment that includes an autonomous vehicle in communication with a remote computing system, according to some aspects of the disclosed technology.

FIG. 5 illustrates environment 500 that includes an autonomous vehicle 502 in communication with a remote computing system 550.

Autonomous vehicle 502 can navigate about roadways without a human driver based upon sensor signals output by sensor systems 504-506 of the autonomous vehicle 502. The autonomous vehicle 502 includes a plurality of sensor systems 504-506 (a first sensor system 504 through an Nth sensor system 506). The sensor systems 504-506 are of different types and are arranged about the autonomous vehicle 502. For example, the first sensor system 504 may be a camera sensor system, and the Nth sensor system 506 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 502 further includes several mechanical systems that are used to effectuate appropriate motion of the autonomous vehicle 502. For instance, the mechanical systems can include but are not limited to, a vehicle propulsion system 530, a braking system 532, and a steering system 534. The vehicle propulsion system 530 may include an electric motor, an internal combustion engine, or both. The braking system 532 can include an engine brake, brake pads, actuators, and/or any other suitable componentry that is configured to assist in decelerating the autonomous vehicle 502. The steering system 534 includes suitable componentry that is configured to control the direction of movement of the autonomous vehicle 502 during navigation.

The autonomous vehicle 502 further includes a safety system 536 that can include various lights and signal indicators, parking brake, airbags, etc. The autonomous vehicle 502 further includes a cabin system 538 that can include cabin temperature control systems, in-cabin entertainment systems, etc.

The autonomous vehicle 502 additionally comprises an internal computing system 510 that is in communication with the sensor systems 504-506 and the systems 530, 532, 534, 536, and 538. The internal computing system includes at least one processor and at least one memory having computer-executable instructions that are executed by the processor. The computer-executable instructions can make up one or more services responsible for controlling the autonomous vehicle 502, communicating with remote computing system 550, receiving inputs from passengers or human co-pilots, logging metrics regarding data collected by sensor systems 504-506 and human co-pilots, etc.

Internal computing system 510 can include control service 512 that is configured to control the operation of vehicle propulsion system 530, braking system 532, steering system 534, safety system 536, and cabin system 538. The control service 512 receives sensor signals from the sensor systems 504-506 as well communicates with other services of the internal computing system 510 to effectuate operation of the autonomous vehicle 502. In some embodiments, control service 512 may carry out operations in concert one or more other systems of autonomous vehicle 502.

The internal computing system 510 can also include a constraint service 514 to facilitate safe propulsion of the autonomous vehicle 502. The constraint service 514 includes instructions for activating a constraint based on a rule-based restriction upon operation of the autonomous vehicle 502. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 512.

The internal computing system 510 can also include a communication service 516. The communication service can include both software and hardware elements for transmitting and receiving signals from/to the remote computing system 550. The communication service 516 is configured to transmit information wirelessly over a network, for example, through an antenna array that provides personal cellular (long-term evolution (LTE), 3G, 5G, etc.) communication.

In some embodiments, one or more services of the internal computing system 510 are configured to send and receive communications to remote computing system 550 for such reasons as reporting data for training and evaluating machine learning algorithms, requesting assistance from remoting computing system or a human operator via remote computing system 550, software service updates, ridesharing pickup and drop off instructions etc.

The internal computing system 510 can also include a latency service 518. The latency service 518 can utilize timestamps on communications to and from the remote computing system 550 to determine if a communication has been received from the remote computing system 550 in time to be useful. For example, when a service of the internal computing system 510 requests feedback from remote computing system 550 on a time-sensitive process, the latency service 518 can determine if a response was timely received from remote computing system 550 as information can quickly become too stale to be actionable. When the latency service 518 determines that a response has not been received within a threshold, the latency service 518 can enable other systems of autonomous vehicle 502 or a passenger to make necessary decisions or to provide the needed feedback.

The internal computing system 510 can also include a user interface service 520 that can communicate with cabin system 538 in order to provide information or receive information to a human co-pilot or human passenger. In some embodiments, a human co-pilot or human passenger may be required to evaluate and override a constraint from constraint service 514, or the human co-pilot or human passenger may wish to provide an instruction to the autonomous vehicle 502 regarding destinations, requested routes, or other requested operations.

As described above, the remote computing system 550 is configured to send/receive a signal from the autonomous vehicle 502 regarding reporting data for training and evaluating machine learning algorithms, requesting assistance from remote computing system 550 or a human operator via the remote computing system 550, software service updates, rideshare pickup and drop off instructions, etc.

The remote computing system 550 includes an analysis service 552 that is configured to receive data from autonomous vehicle 502 and analyze the data to train or evaluate machine learning algorithms for operating the autonomous vehicle 502. The analysis service 552 can also perform analysis pertaining to data associated with one or more errors or constraints reported by autonomous vehicle 502.

The remote computing system 550 can also include a user interface service 554 configured to present metrics, video, pictures, sounds reported from the autonomous vehicle 502 to an operator of remote computing system 550. User interface service 554 can further receive input instructions from an operator that can be sent to the autonomous vehicle 502.

The remote computing system 550 can also include an instruction service 556 for sending instructions regarding the operation of the autonomous vehicle 502. For example, in response to an output of the analysis service 552 or user interface service 554, instructions service 556 can prepare instructions to one or more services of the autonomous vehicle 502 or a co-pilot or passenger of the autonomous vehicle 502.

The remote computing system 550 can also include a rideshare service 558 configured to interact with ridesharing application 570 operating on (potential) passenger computing devices. The rideshare service 558 can receive requests to be picked up or dropped off from passenger ridesharing app 570 and can dispatch autonomous vehicle 502 for the trip. The rideshare service 558 can also act as an intermediary between the ridesharing app 570 and the autonomous vehicle wherein a passenger might provide instructions to the autonomous vehicle to 102 go around an obstacle, change routes, honk the horn, etc.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 6:
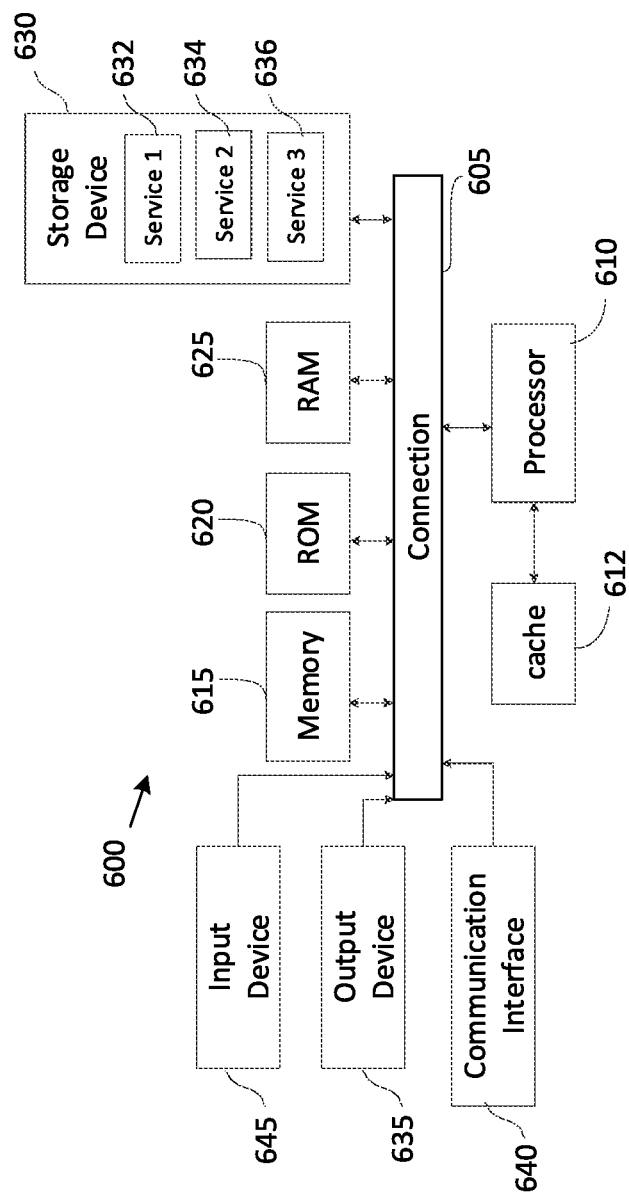
FIG. 6 illustrates an example processor-based system with which some aspects of the subject technology can be implemented.

FIG. 6 shows an example of computing system 600, which can be for example any computing device making up internal computing system 510, remote computing system 550, (potential) passenger device executing rideshare app 570, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method, comprising:
receiving, from a first data set recorded by one or more cameras, an image comprising an image object;
processing the image to place a bounding box around the image object;
processing an image area within the bounding box to identify an image mask corresponding with a pixel region of the image object;
processing the image area within the bounding box to identify a second image mask corresponding with a second pixel region of a second image object in the image;
identifying one or more pixels in the first image object and one or more second pixels in the second image object in the pixel region using the bounding box and the image mask; and
processing the one or more pixels to determine a classification for the first and second image object, the classification being used in 3-dimensional transformation of the image for controlling operation of an Autonomous Vehicle (AV).

2. The computer-implemented method of claim 1, further comprising:
processing the one or more pixels to determine a depth of the image object based on LiDAR data.

3. The computer-implemented method of claim 1, wherein processing the image to place the bounding box around the image object is performed using a first machine-learning model.

4. The computer-implemented method of claim 1, wherein processing the image area within the bounding box to identify the image mask is performed using a second machine-learning model.

5. The computer-implemented method of claim 1, further comprising:

associating a range with the image object based on LiDAR data.

6. A system, comprising:
one or more processors; and
a computer-readable medium comprising instructions stored therein, which when executed by the processors, cause the processors to:
receive, from a first data set recorded by one or more cameras, an image comprising a first image object and a second image object;
process the image to place a bounding box around the first image object and the second image object;
process an image area within the bounding box to identify a first image mask corresponding with a first pixel region of the first image object and a second image mask corresponding with a second pixel region of the second image object;
identify one or more first pixels in the first image object and the second image object using the bounding box, the first image mask, and the second image mask;
processing one or more pixels in the first pixel region to determine a first classification label for the first image object;
processing one or more pixels in the second pixel region to determine a second classification label for the second image object;
process the one or more pixels to determine a classification for the first image object and the second image object, the classification being used in 3-dimensional transformation of the image for controlling operation of an Autonomous Vehicle (AV); and
associating a first classification label with the first image object and a second classification label with the second image object.

7. The system of claim 6, wherein the one or more processors are configured to execute the computer-readable instructions to:
process the first pixel region to determine a depth of the first image object based on LiDAR data.

8. The system of claim 6, wherein the one or more processors are configured to execute the computer-readable instructions to:
process the second pixel region to determine a depth of the second image object based on LiDAR data.

9. The system of claim 6, wherein the one or more processors are configured to execute the computer-readable instructions to process the image to place the bounding box around the first image object and the second image object is performed using a first machine-learning model.

10. The system of claim 6, wherein the one or more processors are configured to execute the computer-readable instructions to process the image area within the bounding box to identify the first image mask is performed using a second machine-learning model.

11. The system of claim 6, wherein the one or more processors are configured to execute the computer-readable instructions to:
associate a first range with the first image object and a second range with the second image object based on LiDAR data.

12. A non-transitory computer-readable storage medium comprising instructions stored therein, which when executed by one or more processors, cause the processors to:
receive, from a first data set recorded by one or more cameras, an image comprising a first image object and a second image object;
process the image to place a bounding box around the first image object and the second image object;
process an image area within the bounding box to identify a first image mask corresponding with a first pixel region of the first image object and a second image mask corresponding with a second pixel region of the second image object;
identify one or more first pixels in the first image object and the second image object using the bounding box, the first image mask, and the second image mask;
processing one or more pixels in the first pixel region to determine a first classification label for the first image object;
processing one or more pixels in the second pixel region to determine a second classification label for the second image object;
process the one or more pixels to determine a classification for the first image object and the second image object, the classification being used in 3-dimensional transformation of the image for controlling operation of an Autonomous Vehicle (AV); and
associating a first classification label with the first image object and a second classification label with the second image object.

13. The non-transitory computer-readable storage medium of claim 12, wherein the one or more processors are further configured to execute the computer-readable instructions to:
process the first pixel region to determine a depth of the first image object based on LiDAR data.

14. The non-transitory computer-readable storage medium of claim 12, wherein the one or more processors are further configured to execute the computer-readable instructions to:
process the second pixel region to determine a depth of the second image object based on LiDAR data.

15. The non-transitory computer-readable storage medium of claim 12, wherein the one or more processors are configure to execute the computer-readable instructions to place the bounding box around the first image object and the second image object is performed using a first machine-learning model.

16. The non-transitory computer-readable storage medium of claim 12, wherein the one or more processors are configure to execute the computer-readable instructions to process the image area within the bounding box to identify the first image mask is performed using a second machine-learning model.

* * * * *